(12) United States Patent
Gao et al.

(10) Patent No.: US 10,490,113 B2
(45) Date of Patent: Nov. 26, 2019

(54) VOLTAGE SHIFT CIRCUIT AND DRIVING METHOD THEREOF, DRIVING DEVICE AND DISPLAY APPARATUS

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Xianyong Gao, Beijing (CN); Shuai Hou, Beijing (CN); Lijun Xiao, Beijing (CN); Bo Xu, Beijing (CN); Siqing Fu, Beijing (CN); Xu Lu, Beijing (CN); Qiang Yu, Beijing (CN); Lisheng Liang, Beijing (CN); Shuai Chen, Beijing (CN); Fei Shang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/087,270

(22) PCT Filed: Feb. 6, 2018

(86) PCT No.: PCT/CN2018/075413
§ 371 (c)(1),
(2) Date: Sep. 21, 2018

(87) PCT Pub. No.: WO2018/157706
PCT Pub. Date: Sep. 7, 2018

(65) Prior Publication Data
US 2019/0103046 A1  Apr. 4, 2019

(30) Foreign Application Priority Data
Mar. 1, 2017  (CN) .......................... 2017 1 0118320

(51) Int. Cl.
*H04L 5/00* (2006.01)
*G09G 3/20* (2006.01)
*H02M 3/158* (2006.01)

(52) U.S. Cl.
CPC .............. *G09G 3/20* (2013.01); *H02M 3/158* (2013.01); *G09G 2310/0289* (2013.01); *G09G 2310/08* (2013.01); *G09G 2330/021* (2013.01)

(58) Field of Classification Search
CPC ...... G09G 3/20; G09G 2310/08; H02M 3/158
(Continued)

(56) References Cited

U.S. PATENT DOCUMENTS 5,343,092 A * 8/1994 Dhong ............... H03K 19/0136
326/126
6,071,341 A * 6/2000 Shimanuki ............ C30B 15/206
117/201
(Continued)

FOREIGN PATENT DOCUMENTS

CN  101996602 A  3/2011
CN  103345094 A  10/2013
(Continued)

OTHER PUBLICATIONS

International Search Report dated May 8, 2018 issued in corresponding to International Application No. PCT/CN2018/075413.
(Continued)

*Primary Examiner* — Dinh T Le
(74) *Attorney, Agent, or Firm* — Nath, Goldberg & Meyer; Joshua B. Goldberg

(57) ABSTRACT

The present application discloses a voltage shift circuit and a driving method thereof, a driving device and a display apparatus. The voltage shift circuit includes: a first input terminal, a second input terminal, a first voltage terminal, a second voltage terminal, and an output terminal. The first
(Continued)

input terminal is configured to input a first signal. The second input terminal is configured to input a second signal. The first voltage terminal is configured to input a first voltage. The second voltage terminal is configured to input a second voltage. The output terminal is configured to output an output signal. The voltage shift circuit is configured to lower the first voltage to an output voltage within a first time using the first signal, and to raise the second voltage to the output voltage within a second time using the second signal. The first time partially overlaps with the second time.

17 Claims, 2 Drawing Sheets

(58) Field of Classification Search
USPC .......................... 327/333; 326/60–62, 80–82
See application file for complete search history.

(56) References Cited

U.S. PATENT DOCUMENTS

| | | | |
|---|---|---|---|
| 6,111,449 A * | 8/2000 | Tobita | H03K 5/08 |
| | | | 257/362 |
| 8,004,343 B2 * | 8/2011 | Kobayashi | B41J 2/04541 |
| | | | 326/31 |
| 10,181,280 B2 | 1/2019 | Hung et al. | |
| 2012/0092316 A1 | 4/2012 | He et al. | |
| 2015/0123961 A1 | 5/2015 | Park et al. | |
| 2017/0229089 A1 | 8/2017 | Song | |
| 2018/0197495 A1 | 7/2018 | Xu et al. | |

FOREIGN PATENT DOCUMENTS

| | | |
|---|---|---|
| CN | 105185285 A | 12/2015 |
| CN | 105528977 A | 4/2016 |
| CN | 106019743 A | 10/2016 |
| CN | 106601180 A | 4/2017 |
| JP | 2005-91385 A | 4/2005 |

OTHER PUBLICATIONS

Office Action dated Feb. 28, 2019 issued in Chinese Application No. 201710118320.0.

\* cited by examiner

VOLTAGE SHIFT CIRCUIT AND DRIVING METHOD THEREOF, DRIVING DEVICE AND DISPLAY APPARATUS

CROSS-REFERENCE TO RELATED APPLICATION

This is a National Phase Application filed under 35 U.S.C. 371 as a national stage of PCT/CN2018/075413, filed on Feb. 6, 2018, an application claiming the benefit of priority to Chinese Patent Application No. 201710118320.0 filed on Mar. 1, 2017, the contents of which are incorporated herein in their entirety by reference.

TECHNICAL FIELD

The present disclosure relates to the field of display technology, and particularly relates to a voltage shift circuit and a driving method thereof, a driving device and a display apparatus.

BACKGROUND

In conventional drive technology, a load is charged and discharged during the transitions of high and low levels of two clock signals. In order to save power, in general, high and low voltages are respectively lowered and raised to a same reference voltage at the same time by means of charge sharing.

SUMMARY

The present disclosure provides a voltage shift circuit and a driving method thereof, a driving device including the voltage shift circuit, and a display apparatus including the driving device.

According to the present disclosure, the voltage shift circuit includes: a first input terminal, a second input terminal, a first voltage terminal, a second voltage terminal, and an output terminal, the first input terminal is configured to input a first signal, and the second input terminal is configured to input a second signal, the first voltage terminal is configured to input a first voltage, the second voltage terminal is configured to input a second voltage, and the output terminal is configured to output an output signal. The voltage shift circuit is configured to lower the first voltage to an output voltage within a first time using the first signal, and to raise the second voltage to the output voltage within a second time using the second signal, and the first time partially overlaps with the second time.

Optionally, the voltage shift circuit includes a first transistor and a second transistor. A control electrode of the first transistor is coupled to the first input terminal, a first electrode of the first transistor is coupled to the first voltage terminal, and a second electrode of the first transistor is coupled to a node, the node being a connection point between the second electrode of the first transistor and a first electrode of the second transistor. A control electrode of the second transistor is coupled to the second input terminal, the first electrode of the second transistor is coupled to the node, and a second electrode of the second transistor is coupled to the second voltage terminal. The first transistor is configured to lower the first voltage to the output voltage according to the first signal; and the second transistor is configured to raise the second voltage to the output voltage according to the second signal.

Optionally, the voltage shift circuit further includes a capacitor, a first terminal of the capacitor is coupled to the node, and a second terminal of the capacitor is coupled to the output terminal. The capacitor is configured to store charges according to the first signal and to release charges according to the second signal.

Optionally, the first voltage is a high level voltage, and the second voltage is a low level voltage.

Optionally, the first signal and the second signal are both rectangular wave signals.

Optionally, the first signal and the second signal are both square wave signals.

Optionally, a rising edge of the second signal is shifted from a rising edge of the first signal by a shift time, the shift time being shorter than the first time.

Optionally, a falling edge of the second signal is shifted from a falling edge of the first signal by a shift time, the shift time being shorter than the first time.

The present disclosure also provides a driving method of a voltage shift circuit. The voltage shift circuit includes: a first input terminal, a second input terminal, a first voltage terminal, a second voltage terminal, and an output terminal, the first input terminal is configured to input a first signal, the second input terminal is configured to input a second signal, the first voltage terminal is configured to input a first voltage, the second voltage terminal is configured to input a second voltage, and the output terminal is configured to output an output signal. The driving method of the voltage shift circuit includes: lowering the first voltage to an output voltage within a first time by using the first signal, and raising the second voltage to the output voltage within a second time by using the second signal, and the first time partially overlaps with the second time.

Optionally, the voltage shift circuit includes a first transistor and a second transistor. A control electrode of the first transistor is coupled to the first input terminal, a first electrode of the first transistor is coupled to the first voltage terminal, and a second electrode of the first transistor is coupled to a node, the node being a connection point between the second electrode of the first transistor and a first electrode of the second transistor. A control electrode of the second transistor is coupled to the second input terminal, the first electrode of the second transistor is coupled to the node, and a second electrode of the second transistor is coupled to the second voltage terminal.

The steps of lowering the first voltage to the output voltage within the first time by using the first signal, and raising the second voltage to the output voltage within the second time by using the second signal include:

lowering, by the first transistor, the first voltage to the output voltage according to the first signal; and raising, by the second transistor, the second voltage to the output voltage according to the second signal.

Optionally, the voltage shift circuit further includes a capacitor, a first terminal of the capacitor is coupled to the node, and a second terminal of the capacitor is coupled to the output terminal.

The steps of lowering the first voltage to the output voltage within the first time by using the first signal, and raising the second voltage to the output voltage within the second time by using the second signal further include: storing charges according to the first signal by the capacitor, and releasing charges according to the second signal by the capacitor.

Optionally, the first voltage is a high level voltage, and the second voltage is a low level voltage.

Optionally, the first signal and the second signal are both rectangular wave signals.

Optionally, the first signal and the second signal are both square wave signals.

Optionally, a rising edge of the second signal is shifted from a rising edge of the first signal by a shift time, the shift time being shorter than the first time.

Optionally, a falling edge of the second signal is shifted from a falling edge of the first signal by a shift time, the shift time being shorter than the first time.

The present disclosure also provides a driving device including the voltage shift circuit according to the present disclosure.

The present disclosure also provides a display apparatus including the driving device according to the present disclosure.

DETAILED DESCRIPTION

To make those skilled, in the art better understand the technical solutions of the present disclosure, a voltage shift circuit and a driving method thereof, a driving device and a display apparatus provided in the present disclosure will be described in detail below in conjunction with the accompanying drawings.

Figure 1:
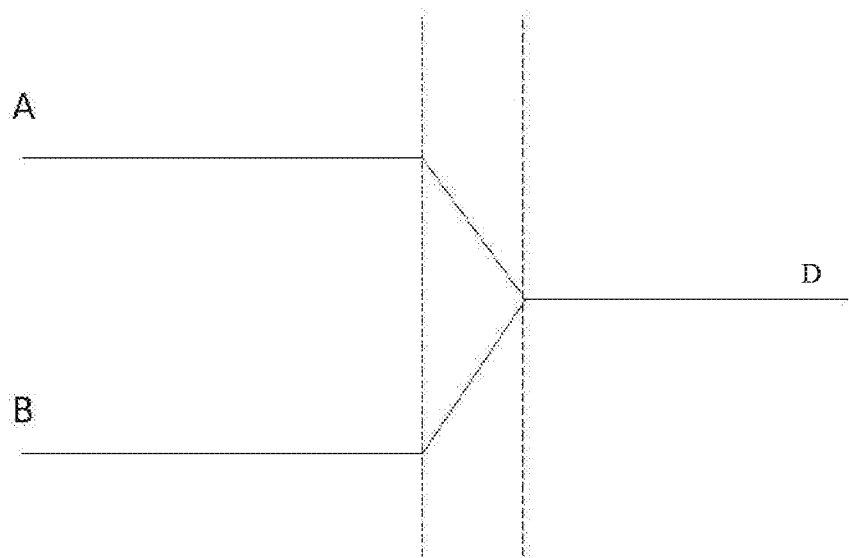
FIG. 1 is a schematic diagram illustrating transitions of high and low levels by means of charge sharing.

FIG. 1 is a schematic diagram illustrating transitions of high and low levels by means of charge sharing. As shown in FIG. 1, high and low voltages are respectively lowered, and raised to a same reference voltage at the same time by means of charge sharing. Specifically, a transition time for lowering a high voltage A to a reference voltage D completely coincides with a transition time for raising a low voltage 13 to the reference voltage D. Thus, in this case, a splash screen will occur in a high temperature reliability test.

According to one aspect of the present disclosure, a voltage shift circuit is provided.

Figure 2:
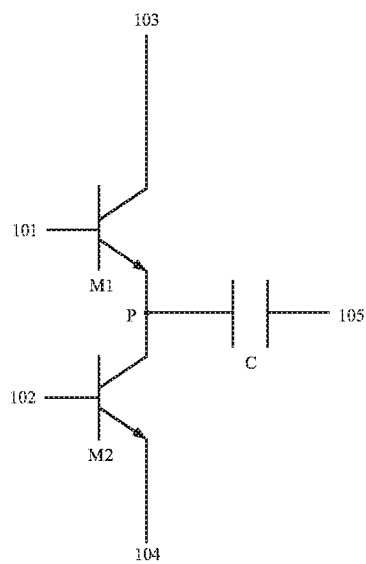
FIG. 2 is a schematic structural diagram of a voltage shift circuit according to an embodiment of the present disclosure.

FIG. 2 is a schematic structural diagram of a voltage shift circuit according to an embodiment of the present disclosure. As shown in FIG. 2, the voltage shift circuit includes: a first input terminal 101, a second input terminal 102, a first voltage terminal 103, a second voltage terminal 104 and an output terminal 105. The first input terminal 101 is configured to input a first signal, the second input terminal 102 is configured to input a second signal, the first voltage terminal 103 is configured to input a first voltage, the second voltage terminal 104 is configured to input a second voltage, and the output terminal 105 is configured to output an output signal. The voltage shift circuit provided in this embodiment is configured to lower the first voltage to an output voltage within a first time by using the first signal, and to raise the second voltage to the output voltage within a second time by using the second signal, and the first time partially overlaps with the second time. The voltage shift circuit provided in this embodiment can not only achieve transition between high and low levels of driving signals and save power, but also avoid a splash screen in a high temperature reliability test.

Figure 3:
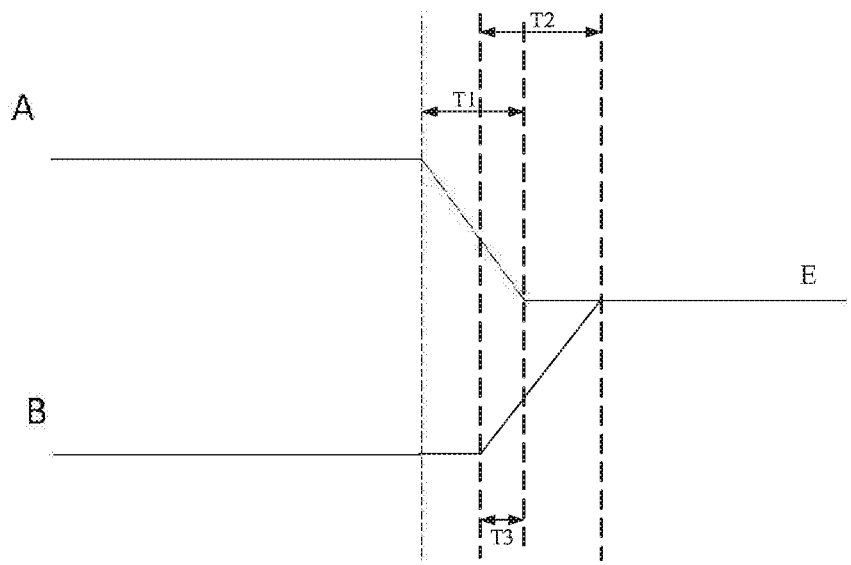
FIG. 3 is a schematic diagram illustrating transitions of high and low levels according to an embodiment of the present disclosure.

FIG. 3 is a schematic diagram illustrating transitions of high and low levels according to an embodiment of the present disclosure. As shown in FIG. 3, the first voltage A is lowered to the output voltage E within the first time T1, the second voltage B is raised to the output voltage E within the second time T2, and the first time T1 partially overlaps with the second time T2. In an embodiment of the present disclosure, a third time T3 is an overlapping portion of the first time T1 and the second time T2. Therefore, in this embodiment, with the above method, the time when the first voltage A is lowered to the output voltage E and the time when the second voltage B is raised to the output voltage E are misaligned, thereby not only achieving transition between high and low levels of driving signals and saving power, but also avoiding a splash screen in a high temperature reliability test.

In some embodiments of the present disclosure, the first voltage is a high level voltage and the second voltage is a low level voltage.

In some embodiments of the present disclosure, the first signal and the second signal are both rectangular wave signals. Optionally, a rising edge of the second signal is shifted from a rising edge of the first signal by a shift time, and the shift time is shorter than the first time. Optionally, a falling edge of the second signal is shifted from a falling edge of the first signal by a shift time, and the shift time is shorter than the first time.

In some embodiments of the present disclosure, the first signal and the second signal are both square wave signals. Optionally, a rising edge of the second signal is shifted from a rising edge of the first signal by a shift time, and the shift time is shorter than the first time. Optionally, a falling edge of the second signal is shifted from a falling edge of the first signal by a shift time, and the shift time is shorter than the first time.

Referring to FIG. 2, the voltage shift circuit includes a first transistor M1 and a second transistor M2. A control electrode (e.g., a gate electrode) of the first transistor M1 is coupled to the first input terminal 101, a first electrode of the first transistor M1 is coupled to the first voltage terminal 103, and a second electrode of the first transistor M1 is coupled to a node P. The node P is a connection point between the second electrode of the first transistor M1 and a first electrode of the second transistor M2. A control electrode (e.g., a gate electrode) of the second transistor M2 is coupled to the second input terminal 102, the first electrode of the second transistor M2 is coupled to the node P, and a second electrode of the second transistor M2 is coupled to the second voltage terminal 104. The first transistor M1 lowers the first voltage to the output voltage according to the first signal, and the second transistor M2 raises the second voltage to the output voltage according to the second signal.

In this embodiment, the voltage shift circuit further includes a capacitor C, a first terminal of the capacitor C is coupled to the node P, and a second terminal of the capacitor C is coupled to the output terminal 105. The capacitor C stores charges according to the first signal, and releases charges according to the second signal. Specifically, during the process of lowering the first voltage A to the output voltage E, under the control of the first signal input from the first input terminal 101, the capacitor C is charged by the first voltage A input from the first voltage terminal 103;

during the process of raising the second voltage B to the output voltage E, under the control of the second signal input from the second input terminal 102, the capacitor C is discharged due to the second voltage B input from the second voltage terminal 104. Therefore, during the transitions of the first voltage A and the second voltage B, no charges are wasted, thereby saving power.

The voltage shift circuit provided in this embodiment includes the following terminals: a first input terminal, a second input terminal, a first voltage terminal, a second voltage terminal, and an output terminal, the first input terminal is configured to input a first signal, the second input terminal is configured to input a second signal, the first voltage terminal is configured to input a first voltage, the second voltage terminal is configured to input a second voltage, and the output terminal is configured to output an output signal; the voltage shift circuit is configured to lower the first voltage to an output voltage within a first time using the first signal, and to raise the second voltage to the output voltage within a second time using the second signal, and the first time partially overlaps with the second time. The voltage shift circuit provided in this embodiment can not only achieve transitions of high and low levels of driving signals and save power, but also avoid a splash screen at a high temperature reliability test.

According to another aspect of the present disclosure, a driving method of a voltage shift circuit is provided. The voltage shift circuit includes: a first input terminal, a second input terminal, a first voltage terminal, a second voltage terminal, and an output terminal, the first input terminal is configured to input a first signal, the second input terminal is configured to input a second signal, the first voltage terminal is configured to input a first voltage, the second voltage terminal is configured to input a second voltage, and the output terminal is configured to output an output signal. The driving method of the voltage shift circuit includes: lowering the first voltage to the output voltage within a first time by using the first signal, and raising the second voltage to the output voltage within a second time by using the second signal, and the first time partially overlaps with the second time.

Figure 4:
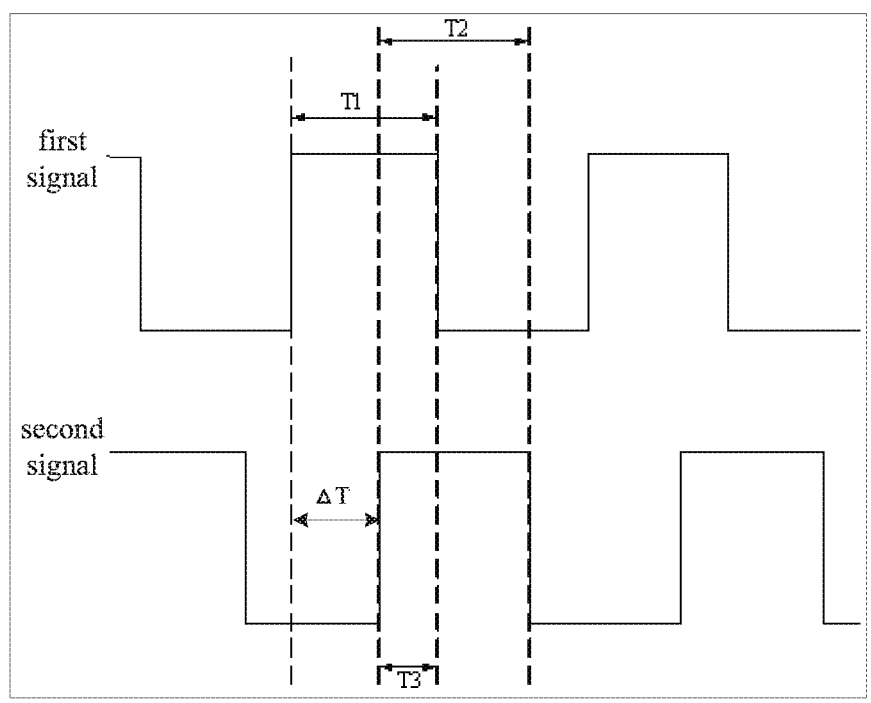
FIG. 4 is an operational timing diagram of a voltage shift circuit according to an embodiment of the present disclosure.

FIG. 4 is an operational timing diagram of a voltage shift circuit according to an embodiment of the present disclosure. As shown in FIGS. 3 and 4, the first voltage A is lowered to the output voltage E within a first time T1 using the first signal, and the second voltage B is raised to the output voltage E within a second time T2 using the second signal, and the first time T1 partially overlaps with the second time T2. Referring to FIG. 4, the third time T3 is an overlapping portion between the first time T1 and the second time T2, the first signal and the second signal are both rectangular wave signals, and a rising edge of the second signal is shifted from a rising edge of the first signal by a time ΔT (i.e., a shift time). In an embodiment of the present disclosure, the first voltage A is a high level voltage and the second voltage B is a low level voltage. In this embodiment, with the above method, the time when the first voltage A is lowered to the output voltage E and the time when the second voltage B is raised to the output voltage E are misaligned, thereby not only achieving transitions of high and low levels of driving signals and saving power, but also avoiding a splash screen in a high temperature reliability test.

Referring to FIG. 2, the voltage shift circuit includes a first transistor M1 and a second transistor M2. A control electrode of the first transistor M1 is coupled to the first input terminal 101, a first electrode of the first transistor M1 is coupled to the first voltage terminal 103, and a second electrode of the first transistor M1 is coupled to a node P. The node P is a connection point between the second electrode of the first transistor M1 and a first electrode of the second transistor M2. A control electrode of the second transistor M2 is coupled to the second input terminal 102, the first electrode of the second transistor M2 is coupled to the node P, and a second electrode of the second transistor M2 is coupled to the second voltage terminal 104.

In this embodiment, the steps of lowering the first voltage to the output voltage within the first time by using the first signal, and raising the second voltage to the output voltage within the second time by using the second signal include: lowering, by the first transistor, the first voltage to the output voltage according to the first signal; and raising, by the second transistor, the second voltage to the output voltage according to the second signal. Referring to FIGS. 3 and 4, the first transistor M1 lowers the first voltage A to the output voltage E according to the first signal, and the second transistor M2 raises the second voltage B to the output voltage E according to the second signal.

Referring to FIG. 2, the voltage shift circuit further includes a capacitor C, a first terminal of the capacitor C is coupled to the node P, a second terminal of the capacitor C is coupled to the output terminal 105. The steps of lowering the first voltage to the output voltage within the first time by using the first signal, and raising the second voltage to the output voltage within the second time by using the second signal further include: storing charges according to the first signal by the capacitor, and releasing charges according to the second signal by the capacitor. Referring to FIGS. 2 and 4, during the process of lowering the first voltage A to the output voltage E, under the control of the first signal input from the first input terminal 101, the capacitor C is charged by the first voltage A input from the first voltage terminal 103; during the process of raising the second voltage B to the output voltage E, under the control of the second signal input from the second input terminal 102, the capacitor C is discharged due to the second voltage input from the second voltage terminal 104. Therefore, during the above voltage transitions, no charges are wasted, thereby saving power.

In the driving method of the voltage shift circuit provided by this embodiment, the voltage shift circuit includes the following terminals; a first input terminal, a second input terminal, a first voltage terminal, a second voltage terminal, and an output terminal, the first input terminal is configured to input a first signal, the second input terminal is configured to input a second signal, the first voltage terminal is configured to input a first voltage, the second voltage terminal is configured to input a second voltage, and the output terminal is configured to output an output signal; the driving method includes; lowering the first voltage to the output voltage within the first time by using the first signal, and raising the second voltage to the output voltage within the second time by using the second signal, the first time partially overlapping with the second time. The driving method of the voltage shift circuit provided in this embodiment can not only achieve transitions of high and low levels of driving signals and save power, but also avoid a splash screen in a high temperature reliability test.

According to another aspect of the present disclosure, there is provided a driving device, which includes the voltage shift circuit according to the embodiments of the present disclosure. For specific structures of the voltage shift circuit, reference may be made to the description of the above embodiments, and details thereof are not repeatedly described herein.

In the driving device provided in this embodiment, the voltage shift circuit includes the following terminals: a first input terminal, a second input terminal, a first voltage terminal, a second voltage terminal, and an output terminal, the first input terminal is configured to input a first signal, the second input terminal is configured to input a second signal, the first voltage terminal is configured to input a first voltage, the second voltage terminal is configured to input a second voltage, and the output terminal is configured to output an output signal; the voltage shift circuit is configured to lower the first voltage to the output voltage within a first time using the first signal, and to raise the second voltage to the output voltage within a second time using the second signal, and the first time partially overlaps with the second time. The driving device provided in this embodiment can not only achieve transitions of high and low levels of driving signals and save power, but also avoid a splash screen at a high temperature reliability test.

According to another aspect of the present disclosure, there is provided a display apparatus including the driving device according to the embodiment of the present disclosure. For specific structures of the driving device, reference may be made to the description of the above embodiment, and details thereof are not repeatedly described herein.

In the display apparatus provided in this embodiment, the voltage shift circuit includes the following terminals: a first input terminal, a second input terminal, a first voltage terminal, a second voltage terminal, and an output terminal, the first input terminal is configured to input a first signal, the second input terminal is configured to input a second signal, the first voltage terminal is configured to input a first voltage, the second voltage terminal is configured to input a second voltage, and the output terminal is configured to output an output signal; the voltage shift circuit is configured to lower the first voltage to the output voltage within a first time using the first signal, and to raise the second voltage to the output voltage within a second time using the second signal, and the first time partially overlaps with the second time. The display apparatus provided in this embodiment can not only achieve transitions of high and low levels of driving signals and save power, but also avoid a splash screen at a high temperature reliability test.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A voltage shift circuit, comprising: a first transistor, a second transistor, a capacitor, a first input terminal, a second input terminal, a first voltage terminal, a second voltage terminal, and an output terminal,
wherein the first input terminal is configured to input a first signal, the second input terminal is configured to input a second signal, the first voltage terminal is configured to input a first voltage, the second voltage terminal is configured to input a second voltage, and the output terminal is configured to output an output signal;
the voltage shift circuit is configured to lower the first voltage to an output voltage within a first time using the first signal, and to raise the second voltage to the output voltage within a second time using the second signal, and the first time partially overlaps with the second time,
a control electrode of the first transistor is coupled to the first input terminal, a first electrode of the first transistor is coupled to the first voltage terminal, and a second electrode of the first transistor is coupled to a node, the node being a connection point between the second electrode of the first transistor and a first electrode of the second transistor,
a control electrode of the second transistor is coupled to the second input terminal, the first electrode of the second transistor is coupled to the node, and a second electrode of the second transistor is coupled to the second voltage terminal;
the first transistor is configured to lower the first voltage to the output voltage according to the first signal;
the second transistor is configured to raise the second voltage to the output voltage according to the second signal; and
a first terminal of the capacitor is coupled to the node a second terminal of the capacitor is coupled to the output terminal, and the capacitor is configured to store charges according to the first signal and to release charges according to the second signal.

2. The voltage shift circuit of claim 1, wherein a turning-on time of the first transistor partially overlaps with a turning-on time of the second transistor.

3. The voltage shift circuit of claim 1, wherein the first voltage is a high level voltage, and the second voltage is a low level voltage.

4. The voltage shift circuit of claim 1, wherein the first signal and the second signal are both rectangular wave signals.

5. The voltage shift circuit of claim 4, wherein the first signal and the second signal are both square wave signals.

6. The voltage shift circuit of claim 4, wherein a rising edge of the second signal is shifted from a rising edge of the first signal by a shift time, and the shift time is shorter than the first time.

7. The voltage shift circuit of claim 4, wherein a falling edge of the second signal is shifted from a falling edge of the first signal by a shift time, and the shift time is shorter than the first time.

8. A driving method of a voltage shift circuit, wherein the voltage shift circuit is the voltage shift circuit of claim 1;
the driving method of the voltage shift circuit comprises:
lowering the first voltage to an output voltage within a first time by using the first signal, and
raising the second voltage to the output voltage within a second time by using the second signal, the first time partially overlapping with the second time.

9. The driving method of claim 8, wherein a turning-on time of the first transistor partially overlaps with a turning-on time of the second transistor.

10. The driving method of claim 9, wherein
steps of lowering the first voltage to the output voltage within the first time by using the first signal and raising the second voltage to the output voltage within the second time by using the second signal further comprise: storing charges according to the first signal by the capacitor, and releasing charges according to the second signal by the capacitor.

11. The driving method of claim 8, wherein the first voltage is a high level voltage, and the second voltage is a low level voltage.

12. The driving method of claim 8, wherein the first signal and the second signal are both rectangular wave signals.

13. The driving method of claim 12, wherein the first signal and the second signal are both square wave signals.

14. The driving method of claim 12, wherein a rising edge of the second signal is shifted from a rising edge of the first signal by a shift time, and the shift time is shorter than the first time.

15. The driving method of claim 12, wherein a falling edge of the second signal is shifted from a falling edge of the first signal by a shift time, and the shift time is shorter than the first time.

16. A driving device, comprising the voltage shift circuit of claim 1.

17. A display apparatus, comprising the driving device of claim 16.

* * * * *